United States Patent
Sharpe et al.

(10) Patent No.: US 12,373,806 B2
(45) Date of Patent: Jul. 29, 2025

(54) SYSTEMS AND METHODS FOR EXECUTING PROGRAMMABLE MACROS BASED ON EXTERNAL DEVICE INTERACTIONS

(71) Applicant: Capital One Services, LLC, McLean, VA (US)

(72) Inventors: Samuel Sharpe, Cambridge, MA (US); Brian Barr, Schenectady, NY (US); Michael Davis, Arlington, VA (US); Taylor Turner, Richmond, VA (US); Justin Au-Yeung, Somerville, MA (US); Tyler Farnan, San Diego, CA (US); Galen Rafferty, Mahomet, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 55 days.

(21) Appl. No.: 18/311,824

(22) Filed: May 3, 2023

(65) Prior Publication Data
US 2024/0370839 A1 Nov. 7, 2024

(51) Int. Cl.
*G06Q 20/10* (2012.01)
(52) U.S. Cl.
CPC .................... *G06Q 20/108* (2013.01)
(58) Field of Classification Search
CPC ........................................................ G06Q 20/108
See application file for complete search history.

(56) References Cited

U.S. PATENT DOCUMENTS

| | | | |
|---|---|---|---|
| 10,346,847 B2 | 7/2019 | Crawford | |
| 10,741,022 B2 | 8/2020 | Schultz et al. | |
| 10,825,000 B1* | 11/2020 | Sanzzi | G06Q 20/102 |
| 11,574,359 B1* | 2/2023 | Ball | G06Q 40/02 |
| 11,699,157 B1* | 7/2023 | Ducker | G06Q 20/4014 |
| | | | 705/75 |
| 2015/0213436 A1 | 7/2015 | Griffin et al. | |
| 2021/0406875 A1* | 12/2021 | Webster | G06Q 20/102 |
| 2022/0383416 A1* | 12/2022 | Curran | G06Q 40/06 |
| 2023/0042992 A1* | 2/2023 | Loveland | G06Q 20/405 |
| 2023/0071115 A1* | 3/2023 | Matsuoka | G06Q 10/06316 |

FOREIGN PATENT DOCUMENTS

KR 20180057041 A 5/2018

* cited by examiner

*Primary Examiner* — Scott C Anderson
(74) *Attorney, Agent, or Firm* — TROUTMAN PEPPER LOCKE LLP; Christopher J. Forstner; John A. Morrissett

(57) ABSTRACT

Disclosed embodiments may include a system for executing programmable macros based on external device interactions. The system may include one or more processors, and a memory in communication with the one or more processors and storing instructions that, when executed by the one or more processors, are configured to cause the system to execute programmable macros based on external device interactions. The system may receive a device identification of an external device. The system may receive a rule associated with the external device, wherein the rule comprises a triggering event and transfer instructions. The system may receive, from the external device, device data. Responsive to determining, from the device data, that the triggering event has occurred, the system may execute the transfer instructions.

20 Claims, 4 Drawing Sheets

SYSTEMS AND METHODS FOR EXECUTING PROGRAMMABLE MACROS BASED ON EXTERNAL DEVICE INTERACTIONS

FIELD

The disclosed technology relates to systems and methods for executing programmable macros based on external device interactions. Specifically, this disclosed technology relates to setting up automatic money transfers based on rules associated with a user's interactions with an external device.

BACKGROUND

Traditional systems and methods for conducting money transfers typically require users to individually schedule and track each desired transfer. Typically, users may either call a financial institution associated with a particular account to initiate a transfer, or log into an application or user profile associated with a financial institution to initiate and/or schedule the transfer.

Accordingly, there is a need for improved systems and methods for executing programmable macros based on external device interactions. Embodiments of the present disclosure may be directed to this and other considerations.

SUMMARY

Disclosed embodiments may include a system for executing programmable macros based on external device interactions. The system may include one or more processors, and a memory in communication with the one or more processors and storing instructions that, when executed by the one or more processors, are configured to cause the system to execute programmable macros based on external device interactions. The system may receive a device identification of an external device. The system may receive a rule associated with the external device, wherein the rule comprises a triggering event and transfer instructions. The system may receive, from the external device, device data. Responsive to determining, from the device data, that the triggering event has occurred, the system may execute the transfer instructions.

Disclosed embodiments may include a system for executing programmable macros based on external device interactions. The system may include one or more processors, and a memory in communication with the one or more processors and storing instructions that, when executed by the one or more processors, are configured to cause the system to execute programmable macros based on external device interactions. The system may receive a device identification of an external device. The system may receive a rule associated with the external device, wherein the rule comprises a triggering event and transfer instructions. The system may receive, from the external device, first device data. Responsive to determining, from the first device data, that the triggering event may occur, the system may transmit an alternate activity suggestion to a user device associated with a user. The system may receive, from the external device, second device data. Responsive to determining, from the second device data, that the user did not follow the alternate activity suggestion, the system may execute the transfer instructions.

Disclosed embodiments may include a system for executing programmable macros based on external device interactions. The system may include one or more processors, and a memory in communication with the one or more processors and storing instructions that, when executed by the one or more processors, are configured to cause the system to execute programmable macros based on external device interactions. The system may receive a device identification of an external device. The system may receive a plurality of rules associated with the external device, wherein each rule of the plurality of rules is associated with a respective user and comprises a respective triggering event and respective transfer instructions. The system may receive, from the external device, device data. Responsive to determining, from the device data, that a first user caused a respective triggering event to occur, the system may execute first transfers instructions, wherein the first transfer instructions are associated with a rule of the plurality of rules that is associated with the first user.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
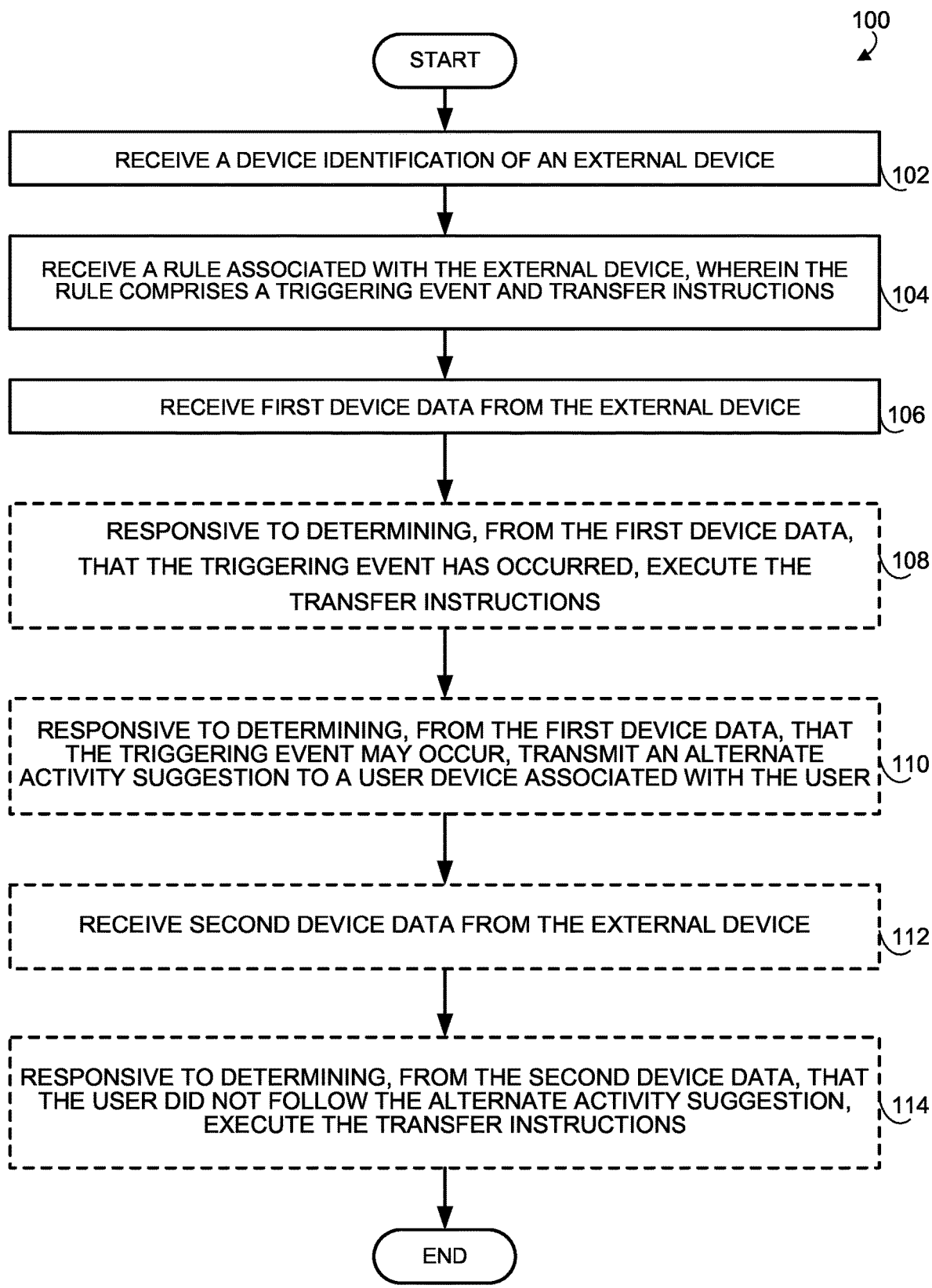
FIG. 1 is a flow diagram illustrating an exemplary method for executing programmable macros based on external device interactions, in accordance with certain embodiments of the disclosed technology.

Conducting money transfers typically requires users to individually schedule and track each desired transfer. Particularly users having multiple accounts across multiple financial institutions may find it challenging to manage such money transfers, especially given the multitude of current applications and programs designed for facilitating different types of transfers. Given these challenges, users may find it beneficial to schedule such money transfers to occur automatically based on certain actions and conduct, for example, with respect to users' day-to-day routines, habits, activities, etc., such that users are not required to track each individual transfer, particularly when a user may desire certain transfers to occur on a regular basis.

Accordingly, examples of the present disclosure may provide for receiving device identification information of an external device; receiving a rule associated with the external device, the rule comprising a triggering event and transfer instructions; receiving device data from the external device;

and executing the transfer instructions based on determining from the device data that the triggering event has occurred.

Disclosed embodiments may employ machine learning models (MLMs), among other computerized techniques, to provide recommendations for rules that may be of interest to, and/or provide certain incentives to, certain users. Machine learning models are a unique computer technology that involves training models to complete tasks and make decisions. These techniques may help to improve database and network operations. For example, the systems and methods described herein may utilize, in some instances, MLMs, which are necessarily rooted in computers and technology, to evaluate rules associated with a first user, and recommend one or more of those rules to a second user based on, for example, similarities between the first and second users, and/or respective interactions of the first and second users with various types of external devices. This, in some examples, may involve using user-specific input data and an MLM, applied to determine money transfer rules that may be applicable and/or of interest to different users based on users' similarities (e.g., interests, day-to-day activities, habits, etc.). Using an MLM and a computer system configured in this way may allow the system to provide a customized money transfer rule based on a variety of user-specific input data.

This may provide an advantage and improvement over prior technologies that may not be configured to provide money transfer rule recommendations, but only to facilitate these rules upon user initiation. The present disclosure solves this problem by evaluating similarities between users, and providing recommendations for potentially desired money transfer rules based on those similarities. Furthermore, examples of the present disclosure may also improve the speed with which computers can provide customized rule recommendations. Overall, the systems and methods disclosed have significant practical applications in the money transfer field because of the noteworthy improvements of the customization of transfer rule recommendations, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for executing programmable macros based on external device interactions, in accordance with certain embodiments of the disclosed technology. The steps of method 100 may be performed by one or more components of the system 400 (e.g., rules-based event monitoring system 320, web server 410 of data processing system 408, user device 402, external device 404, and/or financial service provider 430), as described in more detail with respect to FIGS. 3 and 4. While certain blocks may be identified as being optional, certain embodiments may omit blocks even if they are not necessarily identified as being optional.

In block 102, the rules-based event monitoring system 320 may receive a device identification from an external device. In some embodiments, the device identification may include, for example, a device address (e.g., an internet protocol (IP) address, a media access control (MAC) address, etc.), a near-field communication (NFC) chip, a device name, and the like. In some embodiments, the external device may include an NFC tag or reader, a smart device (e.g., a smart TV), a home assistant device, a personal computing device, analytic device, fitness tracking device, and the like.

In block 104, the rules-based event monitoring system 320 may receive a rule associated with the external device, wherein the rule comprises a triggering event and transfer instructions. In some embodiments, a user may set up the rule, such as through a website and/or an application, such as one owned and/or operated by data processing system 408 or financial service provider 430. In some embodiments, the rule may be in the form of a macro. In some embodiments, the rule may include a triggering event, for example, an event that must occur before which a money transfer can be conducted, and transfer instructions, for example, to provide the system with how to facilitate or conduct a money transfer. For example, a user may log into an application on a user device (e.g., user device 402) and set up a money transfer rule associated with the user's smart TV. The rule may indicate that when the system detects the user has exceeded at least two hours of television watching in one day, as further discussed herein, the system may initiate a certain amount of money (e.g., $3) be transferred from a first account of the user (e.g., a spending account), to a second account of the user (e.g., a savings account).

In some embodiments, the rule may indicate how funds should be earmarked. For example, a rule may indicate that when a smart speaker, e.g., equipped with voice recognition capability, hears a user request a certain item be placed on the user's virtual grocery list, the system may be configured to earmark a particular amount of money in the user's spending account for that item. The system may determine the particular amount of money by searching various applicable merchant websites for an average cost associated with the item.

In some embodiments, a user may register an external device (e.g., through a website and/or application), as further discussed herein, and assign a rule to that external device. For example, a user may register an NFC sensor or tag, and assign a rule to the NFC sensor or tag indicating that each time the user taps another device to the NFC sensor or tag, the system should implement a specific money transfer.

In some embodiments, the rule may include a dynamic rule that may change with any changes in one or more associated features, as further discussed below. For example, a rule may indicate the system should transfer $1 from a user's savings account into the user's spending account for every mile the user runs. However, the rule may also specify that the amount, e.g., the $1, should be varied according to the outside temperature when the user goes running. For example, for each degree colder than 45 degrees, the amount may be increased by a certain percent or factor. A benefit of this type of dynamic or variable rule is that it may provide varied incentive for a user to conduct him or herself in various ways, or participate in certain activities or chores.

In some embodiments, the rule may include intelligently weighted features. For example, a rule may be associated with an external device, such as an NFC-enabled virtual swear jar. The rule may be set up such that should a user say a swear word, the user must tap his or her personal NFC-enabled device (e.g., a mobile phone) to the swear jar, resulting in a certain amount of money being transferred from the user's account to an account(s) of his or her coworker(s). The rule may be intelligently weighted such that certain swear words, e.g., those considered less severe, may be weighted less, while other swear words, e.g., those considered more severe, may be weighted more. The words that are weighted less may be associated with a lower transfer amount, while the words that are weighted more may be associated with a higher transfer amount. As another example, the above rule may be implemented using a smart speaker and voice recognition techniques, such that each time the smart speaker hears a user say a swear word, the smart speaker may identify the applicable rule and the speaker, and initiate the appropriate transfer.

In some embodiments, the rule may be recommended by an MLM. For example, rather than the user create a rule him or herself, as discussed above, the system may utilize an MLM to provide the user with recommendations for rules that may be applicable to or of interest to a user. For example, the MLM may be trained to receive user-specific data associated with a user's routines, habits, day-to-day activities, etc. (e.g., time spent watching television, exercise routines, household chores, etc.) and provide another user with a rule recommendation based on similar routines, habits, day-to-day activities, etc. For example, a first user may enter a second user's home. Both the first and second users may have respective user devices that are connected via the second user's home network. The rules-based event monitoring system 320 may be configured to monitor the respective rules and interactions between the second user and his or her external devices, and provide the first user (e.g., by transmitting a notification to the first user's mobile device) with a recommendation for a similar rule that the first user may be interested in implementing.

In some embodiments, the rule may require user consent. For example, if a rule is recommended by an MLM, as discussed above, the system may be configured to transmit a notification to a user (e.g., via the user's mobile device) to request the user confirm he or she would like to participate in or implement the recommended rule. As another example, if a first user has a rule associated with an external device within the first user's home, and a second user enters the first user's home, the system may be configured to transmit a notification to the second user to request the second user confirm whether he or she would like to participate in the first user's rule.

In some embodiments, the system may be configured to display, such as via a mobile application, devices and/or rules of nearby devices based on a location of the user.

In block 106, the rules-based event monitoring system 320 may receive, from the external device, device data. In some embodiments, the device data may include data indicative of one or more user interactions with the external device. For example, the device data may indicate a specific user's interactions with a smart device, such as the user watching a smart TV, or emptying a smart dishwasher. In some embodiments, the system may be communicatively connected, e.g., via a network (e.g., network 406), to an external device (e.g., external device 404) such that the external device may provide the system with data associated with a user device (e.g., user device 402). For example, as further discussed herein, the system may be communicatively connected to a smart TV via a network, and may be configured to receive data associated with a mobile device of a user from the smart TV. The smart TV may be configured to, for example, track a geolocation of the mobile device and transmit location data to the system such that the system understands the user to be the individual operating the smart TV at a given time.

In some embodiments, the device data may include dynamic data, which may be indicative of a location of the user, a time, a day of the week, weather conditions, biometric data associated with a user, and the like. As discussed herein, receiving this type of dynamic data may enable the system to modify an amount of the transfer based on the dynamic data and in accordance with the rule, prior to executing the transfer instructions. Continuing with the above running example, should the system recognize the outside temperature is below 45 degrees by a certain number of degrees, the system may modify the amount of money to be transferred from the user's savings account to the user's spending account.

In optional block 108, responsive to determining, from the device data, that the triggering event has occurred, the rules-based event monitoring system 320 may execute the transfer instructions. In some embodiments, determining that the triggering event has occurred may include determining, for example, the external device has been turned on (e.g., a smart TV has been turned on); a specified function of the external device has been activated (e.g., a specific application on a smart TV has been activated); a specified functionality of the external device has been utilized for at least a predetermined amount of time (e.g., a timer on an exercise device has been operating for a period of time); a user device has interacted with the external device in a specified way (e.g., an NFC chip on a user device has been tapped against an NFC reader on an external device); and a user has performed a specified action involving the external device or proximate to the external device (e.g., a user has emptied a smart dishwasher).

In some embodiments, determining that the triggering event has occurred may include determining, from the device data, that a user associated with the rule caused the triggering event to occur. In some embodiments, determining that the user associated with the rule caused the triggering event to occur may be based on, for example, determining that a user device associated with the user was used to interact with the external device (e.g., tapping an NFC-enabled user device to an NFC-enabled external device); determining that a user account associated with the user was accessed using the external device (e.g., a payment account of the user was used to buy or rent a movie through an application on a smart TV); determining, using voice recognition techniques, that speech detected by the external device was spoken by the user (e.g., by tracking a voice of a user spoken into a smart speaker); and determining, using geolocation data obtained from the user device associated with the user, that the user was proximate to the external device when the triggering event occurred (e.g., determining the user's smart watch was proximate a smart TV when the smart TV was in operation).

In some embodiments, prior to executing the transfer instructions, the rules-based event monitoring system 320 may perform a security validation. The security validation may include, for example, transmitting, to a user device associated with a user, a notification of an impending execution of the transfer instructions (e.g., transmitting a push notification to the user's mobile device); waiting a predetermined amount of time after determining that the triggering event has occurred without receiving a transfer cancellation instruction from the user (e.g., waiting at least 30 minutes to provide the user with time to cancel the impending transfer, for example, via a graphical user interface (GUI) of a mobile application); and receiving a transfer authorization from the user (e.g., via a GUI of a mobile application on the user's mobile device). A benefit of this feature is that it may provide added security in the event of accidental or fraudulent transfers.

In optional block 110, responsive to determining, from the first device data, that the triggering event may occur, the rules-based event monitoring system 320 may transmit an alternate activity suggestion to a user device associated with a user. In some embodiments, the alternative activity suggestion may include, for example, a suggestion to cease activity that would lead to an occurrence of the triggering event; a suggestion to cease activity representative of a continued occurrence of the triggering event within a predetermined timeframe; or a suggestion to engage in a particular activity that is different from one or more activities associated with the triggering event. For example, if a rule indicates a certain amount of money should be transferred from the user's spending account to his or her savings account if the user watches more than two hours of television in one day, and the system determines the user has already been watching television for one and a half hours, the system may transmit a notification to the user to suggest the user cease watching television and/or begin a new activity. In some embodiments, the system may transmit the alternate activity suggestion, for example, via a notification to the user's mobile device and/or an application on the user's mobile device (e.g., a text message, SMS message, chat message, email, push notification, automated phone call, etc.), or via a message to the applicable external device for display to the user.

In optional block 112, the rules-based event monitoring system 320 may receive, from the external device, second device data. This step may be the same as or similar to the description of block 106, as discussed above. However, the system may receive the second device data after transmitting an alternative activity suggestion to the user, as discussed above.

In optional block 114, responsive to determining, from the second device data, that the user did not follow the alternate activity suggestion, the rules-based event monitoring system 320 may execute the transfer instructions. In some embodiments, determining that the user did not follow the alternate activity suggestion includes determining, from the second device data, that the triggering event has occurred after transmitting the alternate activity suggestion to the user. In continuing the above example, upon receiving second device data, should the system determine that the user has continued watching television and has not ceased watching or has not begun a new activity, the system may execute the transfer instructions, as discussed above with respect to block 108. A benefit of this step is that it provides a user with additional time and incentive to change his or her behavior or activity to prevent the upcoming money transfer, should the user so desire.

Alternatively, in some embodiments, responsive to determining, from the second device data, that the user did follow the alternate activity suggestion, the rules-based event monitoring system 320 may provide the user with an incentive. In some embodiments, this incentive may be its own rule, or part of another rule, as discussed above. In some embodiments, the incentive may include a transfer of incentive funds, a gift card, a coupon, or a future discount. For example, an incentive rule may indicate that for every additional mile the system detects a user runs above a predefined number of miles, the system may transfer ten cents from the user's savings account into the user's spending account. As another example, the system may be configured to incentivize certain behaviors (e.g., less television watching) by transmitting a notification to the user (e.g., via the user's mobile device) indicating that if the user watches less than a certain amount of television, the user can opt to redeem an amount of rewards or points associated with one or more of the user's accounts.

Figure 2:
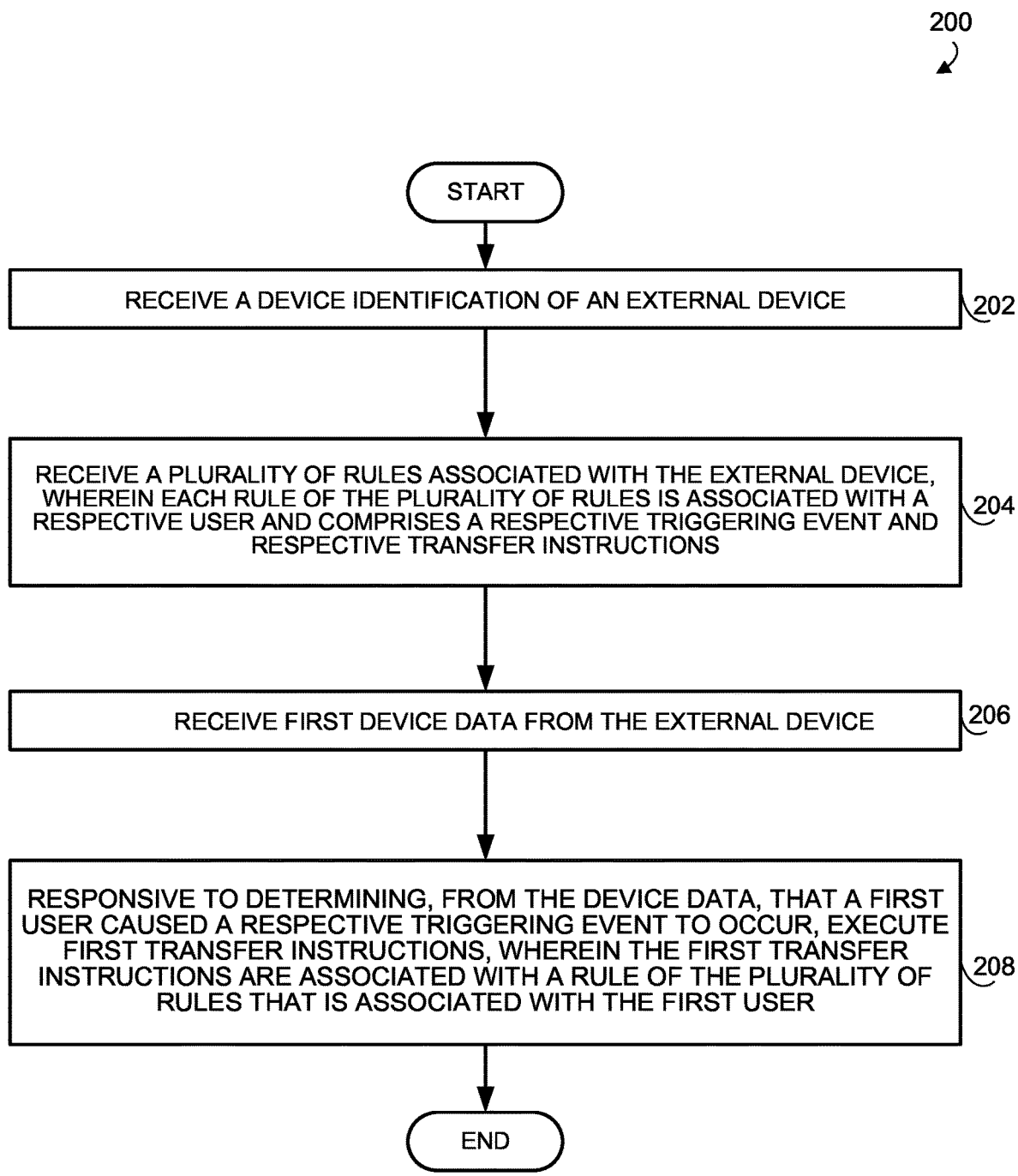
FIG. 2 is a flow diagram illustrating an exemplary method for executing programmable macros based on external device interactions, in accordance with certain embodiments of the disclosed technology.

FIG. 2 is a flow diagram illustrating an exemplary method 200 for executing programmable macros based on external device interactions, in accordance with certain embodiments of the disclosed technology. The steps of method 200 may be performed by one or more components of the system 400 (e.g., rules-based event monitoring system 320, web server 410 of data processing system 408, user device 402, external device 404, and/or financial service provider 430), as described in more detail with respect to FIGS. 3 and 4. While certain blocks may be identified as being optional, certain embodiments may omit blocks even if they are not necessarily identified as being optional.

Method 200 of FIG. 2 may be the same as or similar to method 100 of FIG. 1, except that method 200 may provide a method by which a system receives a plurality of different rules, each rule associated with a different user of a single device. The respective descriptions of blocks 202 and 206 of method 200 may be the same as or similar to the respective descriptions of blocks 102 and 106 of method 100, and as such, are not repeated herein for brevity.

In block 204, the rules-based event monitoring system 320 may receive a plurality of rules associated with an external device, wherein each rule of the plurality of rules is associated with a respective user and comprises a respective triggering event and respective transfer instructions. This step may be the same as or similar to block 104 of method 100. However, in block 204, the system may receive a plurality of rules where each rule is associated with a respective user, and where all respective users and rules are associated with the same external device. In some embodiments, the system may receive the plurality of rules by receiving, from a first user device associated with a first user account, a first rule associated with the external device, and receiving, from a second user device associated with a second user account, a second rule associated with the external device. For example, a family may participate in a television watching incentive program where each member of the family has a respective rule associated with the family's smart TV. The system may receive each family member's respective rule, for example, via a respective user device and through a respective profile of an application. The system may be configured to monitor each family member's time spent watching television, as discussed herein, and to facilitate respective money transfers based on each family member's respective rule and time spent watching television.

In block 208, responsive to determining, from the device data, that a first user caused a respective triggering event to occur, the rules-based event monitoring system 320 may execute first transfers instructions, wherein the first transfer instructions are associated with a rule of the plurality of rules that is associated with the first user. This step may be the same as or similar to block 108 of method 100. However, in block 208, the system may first determine, based on the device data, which user of the plurality of users caused the respective triggering event to occur, as discussed above.

Based on such determination, the system may execute the respective transfer instructions associated with that user's associated rule.

Figure 3:
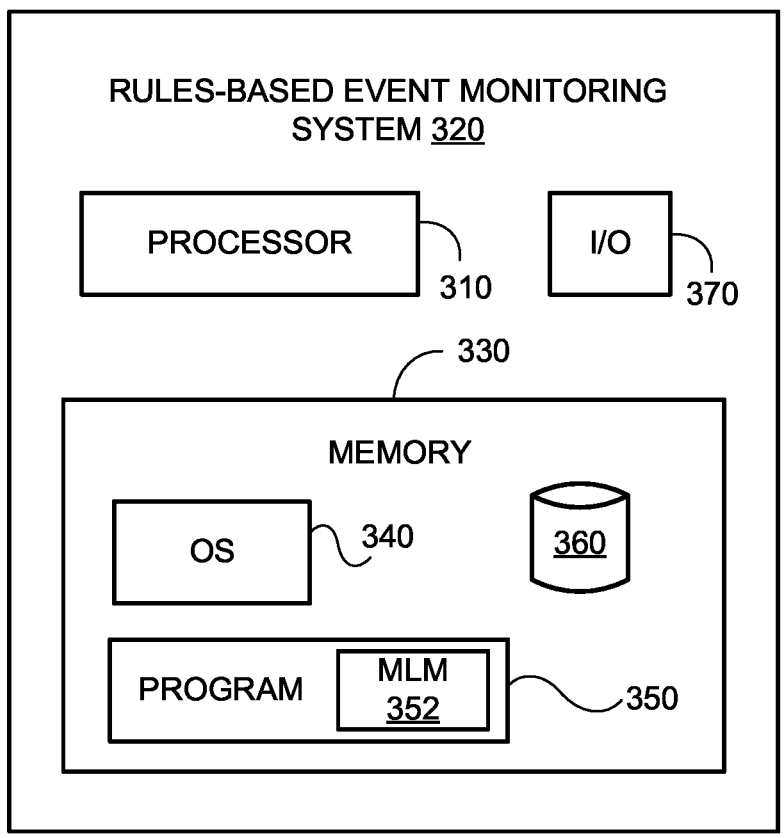
FIG. 3 is a block diagram of an example rules-based event monitoring system used to execute programmable macros based on external device interactions, according to an example implementation of the disclosed technology.
Figure 4:
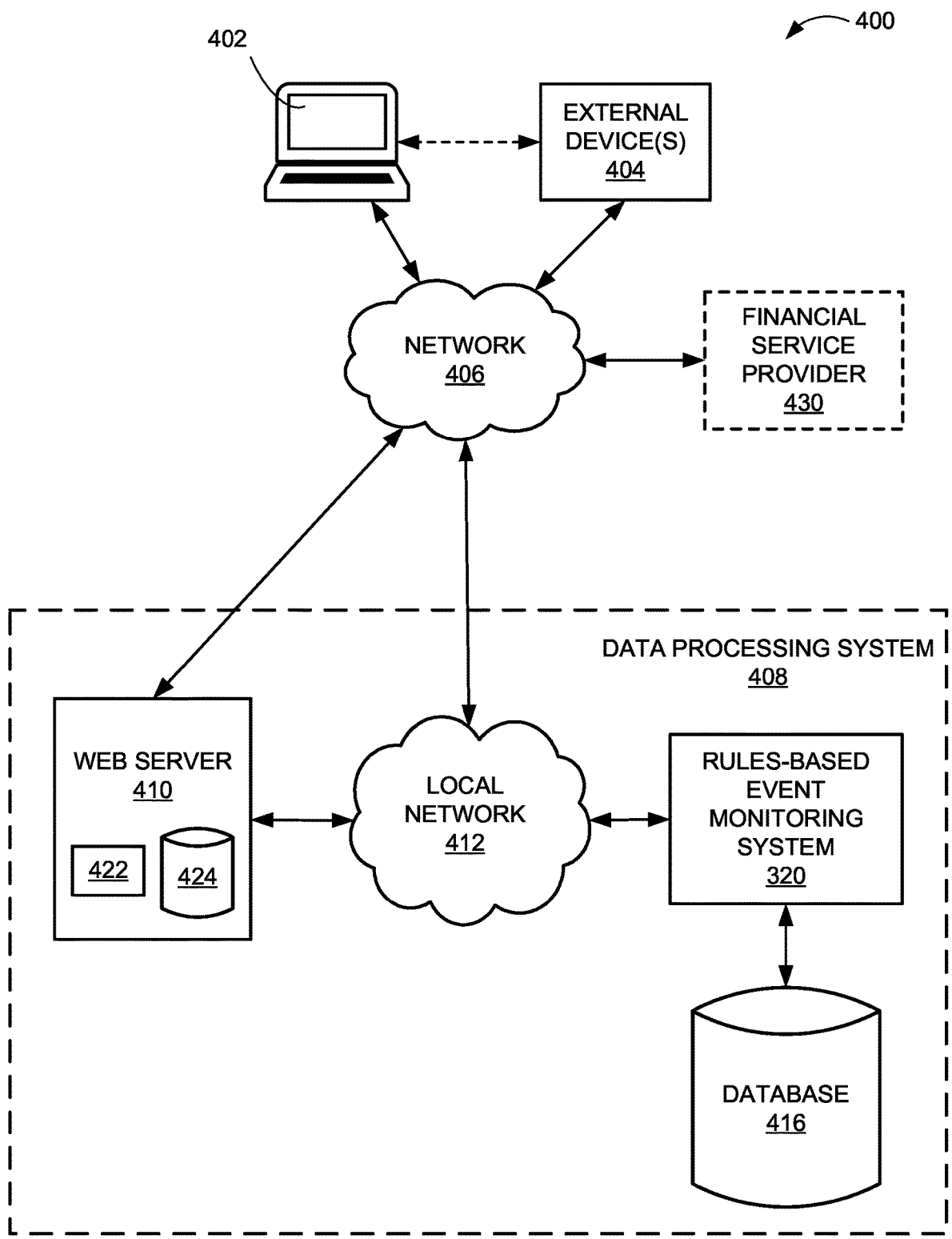
FIG. 4 is a block diagram of an example system that may be used to execute programmable macros based on external device interactions, according to an example implementation of the disclosed technology.

FIG. 3 is a block diagram of an example rules-based event monitoring system 320 used to execute programmable macros based on external device interactions, according to an example implementation of the disclosed technology. According to some embodiments, the user device 402, external device(s) 404, and web server 410, as depicted in FIG. 4 and described below, may have a similar structure and components that are similar to those described with respect to rules-based event monitoring system 320 shown in FIG. 3. As shown, the rules-based event monitoring system 320 may include a processor 310, an input/output (I/O) device 370, a memory 330 containing an operating system (OS) 340 and a program 350. In some embodiments, program 350 may include an MLM 352 that may be trained, for example, to generate recommendations for rules that may be of interest to users with respect to certain external devices. In certain implementations, MLM 352 may issue commands in response to processing an event, in accordance with a model that may be continuously or intermittently updated. Moreover, processor 310 may execute one or more programs (such as via a rules-based platform or the trained MLM 352), that, when executed, perform functions related to disclosed embodiments.

In certain example implementations, the rules-based event monitoring system 320 may be a single server or may be configured as a distributed computer system including multiple servers or computers that interoperate to perform one or more of the processes and functionalities associated with the disclosed embodiments. In some embodiments rules-based event monitoring system 320 may be one or more servers from a serverless or scaling server system. In some embodiments, the rules-based event monitoring system 320 may further include a peripheral interface, a transceiver, a mobile network interface in communication with the processor 310, a bus configured to facilitate communication between the various components of the rules-based event monitoring system 320, and a power source configured to power one or more components of the rules-based event monitoring system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, an NFC port, another like communication interface, or any combination thereof.

In some embodiments, a transceiver may be configured to communicate with compatible devices and ID tags when they are within a predetermined range. A transceiver may be compatible with one or more of: radio-frequency identification (RFID), NFC, Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the rules-based event monitoring system 320 may include one or more storage devices configured to store information used by the processor 310 (or other components) to perform certain functions related to the disclosed embodiments. In one example, the rules-based event monitoring system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The rules-based event monitoring system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the rules-based event monitoring system 320 may include the memory 330 that may include one or more programs 350 to perform one or more functions of the disclosed embodiments. For example, in some embodiments, the rules-based event monitoring system 320 may additionally manage dialogue and/or other interactions with the customer via a program 350.

The processor 310 may execute one or more programs 350 located remotely from the rules-based event monitoring system 320. For example, the rules-based event monitoring system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a database 360 for storing related data to enable the rules-based event monitoring system 320 to perform one or more of the processes and functionalities associated with the disclosed embodiments.

The database 360 may include stored data relating to status data (e.g., average session duration data, location data, idle time between sessions, and/or average idle time between sessions) and historical status data. According to some embodiments, the functions provided by the database 360 may also be provided by a database that is external to the rules-based event monitoring system 320, such as the database 416 as shown in FIG. 4.

The rules-based event monitoring system 320 may also be communicatively connected to one or more memory devices (e.g., databases) locally or through a network. The remote memory devices may be configured to store information and may be accessed and/or managed by the rules-based event monitoring system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The rules-based event monitoring system 320 may also include one or more I/O devices 370 that may comprise one or more interfaces for receiving signals or input from devices and providing signals or output to one or more devices that allow data to be received and/or transmitted by the rules-based event monitoring system 320. For example, the rules-based event monitoring system 320 may include interface components, which may provide interfaces to one or more input devices, such as one or more keyboards, mouse devices, touch screens, track pads, trackballs, scroll wheels, digital cameras, microphones, sensors, and the like, that enable the rules-based event monitoring system 320 to receive data from a user (such as, for example, via the user device 402).

In examples of the disclosed technology, the rules-based event monitoring system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The rules-based event monitoring system 320 may contain programs that train, implement, store, receive, retrieve, and/or transmit one or more MLMs. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The rules-based event monitoring system 320 may be configured to adjust model parameters during training. Model parameters may include weights, coefficients, offsets, or the like. Training may be supervised or unsupervised.

The rules-based event monitoring system 320 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The rules-based event monitoring system 320 may be configured to optimize statistical models using known optimization techniques.

Furthermore, the rules-based event monitoring system 320 may include programs configured to retrieve, store, and/or analyze properties of data models and datasets. For example, rules-based event monitoring system 320 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The rules-based event monitoring system 320 may include algorithms to determine a data type, key-value pairs, row-column data structure, statistical distributions of information such as keys or values, or other property of a data schema may be configured to return a statistical profile of a dataset (e.g., using a data-profiling model). The rules-based event monitoring system 320 may be configured to implement univariate and multivariate statistical methods. The rules-based event monitoring system 320 may include a regression model, a Bayesian model, a statistical model, a linear discriminant analysis model, or other classification model configured to determine one or more descriptive metrics of a dataset. For example, rules-based event monitoring system 320 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The rules-based event monitoring system 320 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, rules-based event monitoring system 320 may be configured to generate a similarity metric representing a measure of similarity between data in a dataset. A similarity metric may be based on a correlation, covariance matrix, a variance, a frequency of overlapping values, or other measure of statistical similarity.

The rules-based event monitoring system 320 may be configured to generate a similarity metric based on data model output, including data model output representing a property of the data model. For example, rules-based event monitoring system 320 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The rules-based event monitoring system 320 may be configured to classify a dataset. Classifying a dataset may include determining whether a dataset is related to another dataset. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The rules-based event monitoring system 320 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, rules-based event monitoring system 320 is configured to generate and/or train a classification model to classify a dataset, consistent with disclosed embodiments.

The rules-based event monitoring system 320 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via a weighted connections. Prediction models may additionally or alternatively include classification and regression trees, or other types of models known to those skilled in the art. To generate prediction models, the asset detection system may analyze information applying machine-learning methods.

While the rules-based event monitoring system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the rules-based event monitoring system 320 may include a greater or lesser number of components than those illustrated.

FIG. 4 is a block diagram of an example system that may be used to view and interact with data processing system 408, according to an example implementation of the disclosed technology. The components and arrangements shown in FIG. 4 are not intended to limit the disclosed embodiments as the components used to implement the disclosed processes and features may vary. As shown, data processing system 408 may interact with a user device 402, external device(s) 404, and/or financial service provider 430 via a network 406. In certain example implementations, the data processing system 408 may include a local network 412, an rules-based event monitoring system 320, a web server 410, and a database 416.

In some embodiments, a respective user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the data processing system 408. In some embodiments, the user device 402 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the data processing system 408. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The rules-based event monitoring system 320 may include programs (scripts, functions, algorithms) to configure data for visualizations and provide visualizations of datasets and data models on the user device 402. This may include programs to generate graphs and display graphs. The rules-based event monitoring system 320 may include programs to generate histograms, scatter plots, time series, or the like on the user device 402. The rules-based event monitoring system 320 may also be configured to display properties of data models and data model training results including, for example, architecture, loss functions, cross entropy, activation function values, embedding layer structure and/or outputs, convolution results, node outputs, or the like on the user device 402.

In some embodiments, external device(s) 404 may include an NFC-enabled device (e.g., having an NFC tag), a smart device (e.g., smart dishwasher, smart TV, etc.), a home assistant device (e.g., a smart speaker), a personal computing device, an analytic device, a fitness tracking device, and the like. A user, such as discussed above, may interact with external device(s) 404 either directly or via a separate user device (e.g., user device 402).

In some embodiments, financial service provider 430 may be a system owned and/or operated by a financial institution, such as one configured to manage different types of user accounts, such as payment, transaction, investment, retirement, etc.

The network 406 may be of any suitable type, including individual connections via the internet such as cellular or WiFi networks. In some embodiments, the network 406 may connect terminals, services, and mobile devices using direct connections such as RFID, NFC, Bluetooth™, BLE, WiFi™, ZigBee™, ABC protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The data processing system 408 may be associated with and optionally controlled by one or more entities such as a business, corporation, individual, partnership, or any other entity that provides one or more of goods, services, and consultations to individuals such as customers. In some embodiments, the data processing system 408 may be controlled by a third party on behalf of another business, corporation, individual, partnership. The account consolidation system 408 may include one or more servers and computer systems for performing one or more functions associated with products and/or services that the organization provides.

Web server 410 may include a computer system configured to generate and provide one or more websites accessible to customers, as well as any other individuals involved in accessing data processing system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that are authenticated by the rules-based event monitoring system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™, Ethernet, and other suitable network connections that enable components of the account consolidation system 408 to interact with one another and to connect to the network 406 for interacting with components in the system 400 environment. In some embodiments, the local network 412 may include an interface for communicating with or linking to the network 406. In other embodiments, certain components of the data processing system 408 may communicate via the network 406, without a separate local network 406.

The data processing system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access data processing system 408 using the cloud computing environment. User device 402 may be able to access data processing system 408 using specialized software. The cloud computing environment may eliminate the need to install specialized software on user device 402.

In accordance with certain example implementations of the disclosed technology, the data processing system 408 may include one or more computer systems configured to compile data from a plurality of sources, such as the rules-based event monitoring system 320, web server 410, and/or the database 416. The rules-based event monitoring system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, A™, and business operations. The database 416 may also serve as a back-up storage device and may contain data and information that is also stored on, for example, database 360, as discussed with reference to FIG. 3.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

Example Use Case

The following example use case describes examples of a typical user flow pattern. This section is intended solely for explanatory purposes and not in limitation.

In one example, a user may log into an application on the user's mobile device, the application associated with a financial institution affiliated with one or more of the user's financial accounts. Within the application, the user may set up a money transfer rule, or a macro, associated with the user's smart TV. The rule may indicate that when the system detects the user has exceeded at least two hours of television watching in one day, the system may initiate a certain amount of money (e.g., $3) be transferred from a first account of the user (e.g., a spending account), to a second account of the user (e.g., a savings account). The system may be configured to detect the user is the individual watching television by tracking the geolocation of the user's mobile device, or by tracking the user's smart TV login account being activated.

In another example, a group of coworkers may desire to set up a rule associated with an NFC-enabled virtual swear jar to disincentivize swearing among the team. A first coworker may log into an application on his or her mobile device to set up the rule which may be configured to transfer a certain amount of money from an account of whichever coworker is caught swearing, across accounts of the other coworkers of the team. The NFC-enabled virtual swear jar may be configured to detect, e.g., using voice recognition techniques, which coworker of the group of coworkers says a swear word. The rule may be configured such that should a first coworker say a swear word, that first coworker must tap his or her personal NFC-enabled device (e.g., a mobile phone) to the swear jar, resulting in a certain amount of money being transferred from the first coworker's account, and being split across respective accounts of the other coworkers. The rule may be intelligently weighted such that certain swear words, e.g., those considered less severe, may be weighted less, while other swear words, e.g., those considered more severe, may be weighted more. The words that are weighted less may be associated with a lower transfer amount, while the words that are weighted more may be associated with a higher transfer amount.

Clause 1: A system comprising: one or more processors; and a memory in communication with the one or more processors and storing instructions that, when executed by the one or more processors, are configured to cause the system to: receive a device identification of an external device; receive a rule associated with the external device, wherein the rule comprises a triggering event and transfer instructions; receive, from the external device, device data; and responsive to determining, from the device data, that the triggering event has occurred, execute the transfer instructions.

Clause 2: The system of clause 1, wherein the system is further configured to: receive dynamic data; and prior to executing the transfer instructions, modify an amount of a transfer based on the dynamic data in accordance with the rule.

Clause 3: The system of clause 2, wherein dynamic data comprises data indicative of one or more of: a location of a user; a time; a day of a week; weather conditions; and biometric data associated with the user.

Clause 4: The system of clause 1, wherein device data comprises data indicative of one or more user interactions with the external device.

Clause 5: The system of clause 4, wherein determining that the triggering event has occurred comprises determining, from the device data, one or more of: the external device has been turned on; a specified function of the external device has been activated; a specified functionality of the external device has been utilized for at least a predetermined amount of time; a user device has interacted with the external device in a specified way; and a user has performed a specified action involving the external device or proximate to the external device.

Clause 6: The system of clause 1, wherein determining that the triggering event has occurred comprises determining, from the device data, that a user associated with the rule caused the triggering event to occur.

Clause 7: The system of clause 6, wherein determining that the user associated with the rule caused the triggering event to occur comprises at least one of: determining that a user device associated with the user was used to interact with the external device; determining that a user account associated with the user was accessed using the external device; determining, using voice recognition techniques, that speech detected by the external device was spoken by the user; and determining, using geolocation data obtained from the user device associated with the user, that the user was proximate to the external device when the triggering event occurred.

Clause 8: The system of clause 1, wherein the system is further configured to: prior to executing the transfer instructions, perform a security validation, wherein the security validation comprises one or more of: transmitting, to a user device associated with a user, a notification of an impending execution of the transfer instructions; waiting a predetermined amount of time after determining that the triggering event has occurred without receiving a transfer cancellation instruction from the user; and receiving a transfer authorization from the user.

Clause 9: The system of clause 1, wherein the rule is a first rule that is associated with a first user, the first rule comprising a first triggering event and first transfer instructions, and the system is further configured to: receive a second rule associated with the external device, wherein the second rule is associated with a second user and the second rule comprises a second triggering event and second transfer instructions.

Clause 10: A system comprising: one or more processors; and a memory in communication with the one or more processors and storing instructions that, when executed by the one or more processors, are configured to cause the system to: receive a device identification of an external device; receive a rule associated with the external device, wherein the rule comprises a triggering event and transfer instructions; receive, from the external device, first device data; responsive to determining, from the first device data, that the triggering event may occur, transmit an alternate activity suggestion to a user device associated with a user; receive, from the external device, second device data; and responsive to determining, from the second device data, that the user did not follow the alternate activity suggestion, execute the transfer instructions.

Clause 11: The system of clause 10, wherein the system is further configured to: responsive to determining, from the second device data, that the user did follow the alternate activity suggestion, provide the user with an incentive.

Clause 12: The system of clause 11, wherein the incentive comprises one or more of: a transfer of incentive funds; a gift card; a coupon; and a future discount.

Clause 13: The system of clause 10, wherein transmitting an alternate activity suggestion to the user comprises one or more of: sending a text message to the user device associated with the user; executing an automated phone call to the user device associated with the user; sending a chat message to the user device associated with the user; sending a push notification to a software application installed on the user device associated with the user; and sending a message to the external device for display to the user.

Clause 14: The system of clause 10, wherein the alternate activity suggestion comprises one or more of: a suggestion to cease activity that would lead to an occurrence of the triggering event; a suggestion to cease activity representative of a continued occurrence of the triggering event within a predetermined timeframe; or a suggestion to engage in a particular activity that is different from one or more activities associated with the triggering event.

Clause 15: The system of clause 10, wherein determining that the user did not follow the alternate activity suggestion comprises determining, from the second device data, that the triggering event has occurred after transmitting the alternate activity suggestion to the user.

Clause 16: A system comprising: one or more processors; and a memory in communication with the one or more processors and storing instructions that, when executed by the one or more processors, are configured to cause the system to: receive a device identification of an external device; receive a plurality of rules associated with the external device, wherein each rule of the plurality of rules is associated with a respective user and comprises a respective triggering event and respective transfer instructions; receive, from the external device, device data; and responsive to determining, from the device data, that a first user caused a respective triggering event to occur, execute first transfers instructions, wherein the first transfer instructions are associated with a rule of the plurality of rules that is associated with the first user.

Clause 17: The system of clause 16, wherein the system is further configured to: determine, from the device data, that a second user caused a respective triggering event to occur; and execute second transfer instructions, wherein the second transfer instructions are associated with a rule of the plurality of rules that is associated with the second user.

Clause 18: The system of clause 16, wherein receiving a plurality of rules associated with the external device comprises: receiving, from a first user device associated with a first user account, a first rule associated with the external device; and receiving, from a second user device associated with a second user account, a second rule associated with the external device.

Clause 19: The system of clause 16, wherein the external device comprises one of: a near field communication tag; a smart TV; a home assistant device; or a personal computing device.

Clause 20: The system of clause 16, wherein determining that the first user caused a respective triggering event to occur comprises determining, from the device data, one or more of: the external device has been turned on by the first user; a specified function of the external device has been activated by the first user; a specified functionality of the external device has been utilized for at least a predetermined amount of time by the first user; a user device associated with the first user has interacted with the external device in a specified way; and the first user has performed a specified action involving the external device or proximate to the external device.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description.

References to "one embodiment," "an embodiment," "some embodiments," "example embodiment," "various embodiments," "one implementation," "an implementation," "example implementation," "various implementations." "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   one or more processors; and
   a memory in communication with the one or more processors and storing instructions that, when executed by the one or more processors, are configured to cause the system to:
   receive a device identification of an external device from a first user via a website or application to register the external device as available to be assigned one or more rules;
   recommend, using a machine learning model (MLM) trained using user-specific data associated with a second user's daily activities, a rule associated with the external device to the first user based on the first user having similar daily activities to the second user;
   receive, via user input from a user device, an activation of the rule associated with the external device, wherein the user input is performed by the first user and the rule comprises a triggering event and transfer instructions;
   receive, from the external device, device data; and
   responsive to determining, from the device data, that the triggering event has occurred, execute the transfer instructions.

2. The system of claim 1, wherein the system is further configured to:
   receive dynamic data; and
   prior to executing the transfer instructions, modify an amount of a transfer based on the dynamic data in accordance with the rule.

3. The system of claim 2, wherein dynamic data comprises data indicative of one or more of:
   a location of a user;
   a time;
   a day of a week;
   weather conditions; and
   biometric data associated with the user.

4. The system of claim 1, wherein device data comprises data indicative of one or more user interactions with the external device.

5. The system of claim 4, wherein determining that the triggering event has occurred comprises determining, from the device data, one or more of:
   the external device has been turned on;
   a specified function of the external device has been activated;
   a specified functionality of the external device has been utilized for at least a predetermined amount of time;
   a user device has interacted with the external device in a specified way; and
   a user has performed a specified action involving the external device or proximate to the external device.

6. The system of claim 1, wherein determining that the triggering event has occurred comprises determining, from the device data, that a user associated with the rule caused the triggering event to occur.

7. The system of claim 6, wherein determining that the user associated with the rule caused the triggering event to occur comprises at least one of:

determining that a user device associated with the user was used to interact with the external device;

determining that a user account associated with the user was accessed using the external device;

determining, using voice recognition techniques, that speech detected by the external device was spoken by the user; and determining, using geolocation data obtained from the user device associated with the user, that the user was proximate to the external device when the triggering event occurred.

8. The system of claim 1, wherein the system is further configured to:

prior to executing the transfer instructions, perform a security validation, wherein the security validation comprises one or more of:

transmitting, to a user device associated with a user, a notification of an impending execution of the transfer instructions;

waiting a predetermined amount of time after determining that the triggering event has occurred without receiving a transfer cancellation instruction from the user; and receiving a transfer authorization from the user.

9. The system of claim 1, wherein the rule is a first rule that is associated with the first user, the first rule comprising a first triggering event and first transfer instructions, and the system is further configured to:

receive a second rule associated with the external device, wherein the second rule is associated with a third user and the second rule comprises a second triggering event and second transfer instructions.

10. A method comprising:

receiving a device identification of an external device from a first user via a website or application to register the external device as available to be assigned one or more rules;

recommending, using a machine learning model (MLM) trained using user-specific data associated with a second user's daily activities, a rule associated with the external device to the first user based on the first user having similar daily activities to the second user;

receiving, via user input from a user device, an activation of the rule associated with the external device, wherein the user input is performed by the first user and the rule comprises a triggering event and transfer instructions;

receiving, from the external device, device data; and responsive to determining, from the device data, that the triggering event has occurred, executing the transfer instructions.

11. The method of claim 10, further comprising:

receiving dynamic data; and prior to executing the transfer instructions, modifying an amount of a transfer based on the dynamic data in accordance with the rule.

12. The method of claim 11, wherein dynamic data comprises data indicative of one or more of:

a location of a user;

a time;

a day of a week;

weather conditions; and biometric data associated with the user.

13. The method of claim 10, wherein device data comprises data indicative of one or more user interactions with the external device.

14. The method of claim 13, wherein determining that the triggering event has occurred comprises determining, from the device data, one or more of:

the external device has been turned on;

a specified function of the external device has been activated;

a specified functionality of the external device has been utilized for at least a predetermined amount of time;

a user device has interacted with the external device in a specified way; and a user has performed a specified action involving the external device or proximate to the external device.

15. The method of claim 10, wherein determining that the triggering event has occurred comprises determining, from the device data, that a user associated with the rule caused the triggering event to occur.

16. The method of claim 15, wherein determining that the user associated with the rule caused the triggering event to occur comprises at least one of:

determining that a user device associated with the user was used to interact with the external device;

determining that a user account associated with the user was accessed using the external device;

determining, using voice recognition techniques, that speech detected by the external device was spoken by the user; and determining, using geolocation data obtained from the user device associated with the user, that the user was proximate to the external device when the triggering event occurred.

17. The method of claim 10, further comprising:

prior to executing the transfer instructions, performing a security validation, wherein the security validation comprises one or more of:

transmitting, to a user device associated with a user, a notification of an impending execution of the transfer instructions;

waiting a predetermined amount of time after determining that the triggering event has occurred without receiving a transfer cancellation instruction from the user; and receiving a transfer authorization from the user.

18. The method of claim 10, wherein the rule is a first rule that is associated with the first user, the first rule comprising a first triggering event and first transfer instructions, and the method further comprising:

receiving a second rule associated with the external device, wherein the second rule is associated with a third user and the second rule comprises a second triggering event and second transfer instructions.

19. A non-transitory computer readable medium having stored thereon instructions comprising executable code that, when executed by one or more processors, causes the one or more processors to:

receive a device identification of an external device from a first user via a website or application to register the external device as available to be assigned one or more rules;

recommend, using a machine learning model (MLM) trained using user-specific data associated with a second user's daily activities, a rule associated with the external device to the first user based on the first user having similar daily activities to the second user;

receive, via user input from a user device, an activation of the rule associated with the external device, wherein the user input is performed by the first user and the rule comprises a triggering event and transfer instructions;

receive, from the external device, device data; and responsive to determining, from the device data, that the triggering event has occurred, execute the transfer instructions.

20. The non-transitory computer readable medium of claim 19, wherein the instructions are further configured to cause the one or more processors to:

receive dynamic data; and prior to executing the transfer instructions, modify an amount of a transfer based on the dynamic data in accordance with the rule.

* * * * *